(12) United States Patent
Liu et al.

(10) Patent No.: US 11,661,467 B2
(45) Date of Patent: May 30, 2023

(54) HIGH-PERFORMANCE RUBBER DAMPING MATERIAL AND METHOD FOR PREPARING THE SAME

(71) Applicant: Agricultural Products Processing Research Institute, Chinese Academy of Tropical Agricultural Sciences, Guangdong (CN)

(72) Inventors: Hongchao Liu, Guangdong (CN); Heping Yu, Guangdong (CN); Qifang Wang, Guangdong (CN); Yongzhen Li, Guangdong (CN); Zheng Peng, Guangdong (CN)

(73) Assignee: Agricultural Products Processing Research Inst., Chinese Academy of Tropical Agricultural Sciences, Guangdong (CN)

( * ) Notice: Subject to any disclaimer, the term of this patent is extended or adjusted under 35 U.S.C. 154(b) by 307 days.

(21) Appl. No.: 17/213,485

(22) Filed: Mar. 26, 2021

(65) Prior Publication Data
US 2021/0395423 A1 Dec. 23, 2021

(30) Foreign Application Priority Data
Jun. 18, 2020 (CN) .......................... 202010562305.7

(51) Int. Cl.
*C08F 253/00* (2006.01)
*C08L 51/04* (2006.01)
*C08F 279/02* (2006.01)

(52) U.S. Cl.
CPC .......... *C08F 253/00* (2013.01); *C08F 279/02* (2013.01); *C08L 51/04* (2013.01)

(58) Field of Classification Search
None
See application file for complete search history.

(56) References Cited

U.S. PATENT DOCUMENTS 6,593,460 B1 * 7/2003 Huttermann ............. C09K 3/22
527/400

* cited by examiner

*Primary Examiner* — Christopher M Rodd
(74) *Attorney, Agent, or Firm* — IP & T Group LLP

(57) ABSTRACT

The present disclosure discloses a high-performance rubber damping material and a method for preparing the same, relating to the technical field of damping materials. The method for preparing the high-performance rubber damping material includes: grafting hydroxyethyl methacrylate and lignin to a rubber molecular chain of natural rubber latex through graft copolymerization reaction, so as to obtain a high-performance rubber damping material. This method adopts natural rubber latex as a base material, the hydroxyethyl methacrylate and lignin are grafted to the rubber molecular chain of natural rubber latex through graft copolymerization reaction, to form a semi-interpenetrating network structure.

20 Claims, No Drawings

HIGH-PERFORMANCE RUBBER DAMPING MATERIAL AND METHOD FOR PREPARING THE SAME

CROSS-REFERENCE TO RELATED APPLICATION

This application claims priority to Chinese Patent Application No. 202010562305.7, filed with the Chinese Patent Office on Jun. 18, 2020, entitled "High-performance Rubber Damping Material and Method for Preparing the Same", which is incorporated herein by reference in its entirety.

TECHNICAL FIELD

The present disclosure relates to the technical field of damping materials, in particular, to a high-performance rubber damping material and a method for preparing the same.

BACKGROUND ART

As a vibration damping material developed in the 60s of the last century, the viscoelastic rubber damping material converts vibration energy into heat energy mainly through the friction of molecular chains so as to achieve the damping purpose, and has the advantages such as light weight and outstanding damping effect of resonance points. However, the effective damping temperature range of the viscoelastic rubber damping factor tan $\delta$>0.3 is generally lower than room temperature, and it can only have certain damping effect on vibration of more than medium frequency in a quite narrow effective damping temperature range ($\Delta T$<30° C.).

In various kinds of rubber, butyl, butyronitrile and silicone rubber have high molecular chain polarity and a large number of side groups, a large friction force between the molecular chains in the stress-strain process, and an excellent damping effect, and plays an important role in damping materials. From the 70s of the last century, relevant research institutions in China develop a series of damping materials by taking butyl, butyronitrile and silicone rubber as substrate, and doping phenolic resin, special filler and other micromolecular substances, and provide guarantee for the research and production of high-performance damping materials in China.

However, most damping materials are required to exert damping action under continuous loading stress and dynamic conditions. This requires that the damping material not only has excellent damping performance, but also must have relatively high tensile strength, excellent creep resistance, deflection resistance and other properties, and timely emits the generated heat to the outside. Although the existing damping materials in China can substantially meet the damping requirement, the existing damping materials are low in tensile strength, large in creep property, intolerance to deflection, high in heat generation and short in service life, generate large creep under the action of long-time continuous stress, and lose the damping and sealing effects, thus obviously influencing the damping effect.

Therefore, it is necessary to develop a high-performance rubber damping material, which has the damping properties of wide effective damping temperature range and wide frequency, and meanwhile has the characteristics of high tensile strength, aging resistance, low heat generation, etc.

In view of this, the present disclosure is specifically proposed.

SUMMARY

In a first aspect, an example of the present disclosure provides a method for preparing a high-performance rubber damping material, including:

grafting hydroxyethyl methacrylate and lignin to a rubber molecular chain of natural rubber latex through graft copolymerization reaction, so as to obtain a high-performance rubber damping material.

In a second aspect, an example of the present disclosure provides a high-performance rubber damping material, which is prepared by a method for preparing the high-performance rubber damping material according to any one of the preceding embodiments.

DETAILED DESCRIPTION OF EMBODIMENTS

In order to make the objectives, technical solutions and advantages of the examples of the present disclosure more clear, the technical solutions in the examples of the present disclosure are described clearly and completely below. If no specific conditions are specified in the examples, they are carried out under normal conditions or conditions recommended by the manufacturer. If manufacturers of reagents or apparatuses used are not specified, they are conventional products commercially available.

The present disclosure aims at providing a high-performance rubber damping material and a method for preparing the same, wherein in this method, hydroxyethyl methacrylate and lignin are grafted to a rubber molecular chain of natural rubber latex through graft copolymerization reaction, then a high-performance rubber damping material with wide effective damping temperature range and wide frequency, and having the advantages of high tensile strength, aging resistance, and low heat generation may be obtained.

The present disclosure is realized as follows.

In a first aspect, an example of the present disclosure provides a method for preparing a high-performance rubber damping material, including:

grafting hydroxyethyl methacrylate and lignin to a rubber molecular chain of natural rubber latex through graft copolymerization reaction, so as to obtain a high-performance rubber damping material.

In an optional embodiment, the step of grafting hydroxyethyl methacrylate and lignin to a rubber molecular chain of natural rubber latex through graft copolymerization reaction specifically includes:

adding a nonionic surfactant to the natural rubber latex, and successively adding the hydroxyethyl methacrylate, the lignin, the initiator and the crosslinking agent after stabilization;

adding an activator and water after standing under a nitrogen protection condition, and performing emulsion graft copolymerization reaction under a non-oxidizing atmosphere, to obtain hydroxyethyl methacrylate-lignin graft modified natural rubber latex; and making the hydroxyethyl methacrylate-lignin graft modified natural rubber latex undergo rubber processing operation to obtain modified natural rubber.

In an optional embodiment, in parts by weight, the natural rubber latex is 100 parts in dry rubber of natural rubber, the hydroxyethyl methacrylate is added in an amount of 1-30 parts, the lignin is added in an amount of 1-20 parts, the nonionic surfactant is added in an amount of 1-5 parts, the initiator is added in an amount of 0.05-0.5 parts, the crosslinking agent is added in an amount of 0.02-0.2 parts, the activator is added in an amount of 0.05-0.5 parts, and after the addition of water, the total solid content of reaction system is controlled at 15-35 wt %.

In an optional embodiment, the step of standing is carried out at a temperature of 15-45° C. for 10-24 h.

In an optional embodiment, the step of graft copolymerization reaction is carried out at a temperature of 10-60° C. for 10-30 h.

In an optional embodiment, the step of rubber processing operation at least includes steps of coagulation, preforming, washing and drying.

In an optional embodiment, the natural rubber latex is centrifugal concentrated rubber latex of *Hevea brasiliensis*, and the total solid mass fraction is 50-70%;

the nonionic surfactant is polyoxyethylene fatty alcohol ether, and needs to be formulated into an aqueous solution with the concentration of 5 wt-20 wt % before the addition;

the initiator is isopropyl benzene hydroperoxide or tert-butyl hydroperoxide;

the crosslinking agent is triethylene glycol dimethacrylate; and the activator is tetraethylenepentamine or ethylenediamine.

In an optional embodiment, the initiator is isopropyl benzene hydroperoxide; and the activator is tetraethylenepentamine.

In an optional embodiment, the method further includes performing mixing and vulcanization operation on the modified natural rubber, wherein a vulcanization compounding agent needs to be added in the vulcanization operation, and the vulcanization compounding agent corresponding to each 100 parts of the modified natural rubber includes 1.0 part of zinc 2-ethylhexanoate, 0.6 parts of sulfur, 5.0 parts of zinc oxide, 2.5 parts of N-oxydiethylent-2-benzothiazole sulfenamide, 1.0 part of bis(thioperoxydiformyl) tetrabutyl diamine and 1.0 part of N-phenyl-α-naphthylamine, in parts by weight.

In a second aspect, an example of the present disclosure provides a high-performance rubber damping material, which is prepared by a method for preparing the high-performance rubber damping material according to any one of the preceding embodiments.

The examples of the present disclosure at least have the following advantages or beneficial effects:

The method for preparing a high-performance rubber damping material provided in the examples of the present disclosure includes: grafting hydroxyethyl methacrylate and lignin to the rubber molecular chain of natural rubber latex through graft copolymerization reaction, so as to obtain the high-performance rubber damping material. This method adopts natural rubber latex as a base material, the hydroxyethyl methacrylate and lignin are grafted to the rubber molecular chain of natural rubber latex through graft copolymerization reaction, to form a semi-interpenetrating network structure. By means of a relatively high effective damping temperature range of polyhydroxyethyl methacrylate, and meanwhile the lignin's effect of improving the damping value of materials, the high-performance damping material taking natural rubber as main body has the characteristics of wide effective damping temperature range and high damping, and meanwhile has the characteristics of high tensile strength, aging resistance, low heat generation, etc.

The high-performance rubber damping material provided in the examples of the present disclosure is prepared by the above preparation method. Therefore, it has the characteristics of wide effective damping temperature range and high damping, and meanwhile has the characteristics of high tensile strength, aging resistance, low heat generation, etc.

The features and performances of the present disclosure are further described in detail below in combination with examples.

An example of the present disclosure provides a method for preparing a high-performance rubber damping material, including: grafting hydroxyethyl methacrylate and lignin to a rubber molecular chain of natural rubber latex through graft copolymerization reaction, so as to obtain a high-performance rubber damping material.

It should be indicated that this method adopts natural rubber latex as a base material, and the hydroxyethyl methacrylate and lignin are grafted to the rubber molecular chain of natural rubber latex through graft copolymerization reaction, then a semi-interpenetrating network structure may be formed. In the above, the hydroxyethyl methacrylate, mainly used for modification of resin and coating, has a relatively high effective damping temperature range, and may endow the the rubber damping material prepared with the advantages of wide effective damping temperature range and high damping. Meanwhile, lignin is a biopolymer having a three-dimensional net-shaped structure formed by interconnecting three phenylpropane units through an ether bond and a carbon-carbon bond, contains abundant active groups such as aromatic ring structures, aliphatic and aromatic hydroxyl groups and quinone groups, and may effectively improve the damping value of the material, so that the high-performance damping material that takes natural rubber as a main body has the characteristics of wide effective damping temperature range and high damping, and meanwhile has the characteristics of high tensile strength, aging resistance, low heat generation, etc.

In detail, the step of grafting hydroxyethyl methacrylate and lignin to a rubber molecular chain of natural rubber latex through graft copolymerization reaction specifically includes:

S1: adding a nonionic surfactant to the natural rubber latex, and successively adding the hydroxyethyl methacrylate, the lignin, an initiator and a crosslinking agent after stabilization.

In detail, the natural rubber latex is 100 parts in dry rubber of natural rubber, and centrifugal concentrated rubber latex of *Hevea brasiliensis* may be specifically selected as the natural rubber latex, and the total solid mass fraction is 50-70%. Meanwhile, the nonionic surfactant is added in an amount of 1-5 parts, and the nonionic surfactant is polyoxyethylene fatty alcohol ether, and needs to be formulated into an aqueous solution with the concentration of 5 wt-20 wt % before the addition. Correspondingly, the hydroxyethyl methacrylate is added in an amount of 1-30 parts, and the lignin is added in an amount of 1-20 parts, which may be formulated in advance into an aqueous dispersion with concentration of 50% during preparation. The initiator is isopropyl benzene hydroperoxide or tert-butyl hydroperoxide, preferably isopropyl benzene hydroperoxide, and the initiator is added in an amount of 0.05-0.5 parts. The crosslinking agent is triethylene glycol dimethacrylate, and the crosslinking agent is added in an amount of 0.02-0.2 parts. Through the reasonable ratios of the respective ingredients above, sufficiency guarantee can be provided for preparing the high-performance rubber damping material having the advantages of wide effective damping temperature range, wide frequency, high tensile strength, aging resistance and low heat generation. Undoubtedly, in other examples, specific use amounts of respective ingredients further may be adjusted according to requirements, and no limitation is made in the examples of the present disclosure.

S2: adding an activator and water after standing under a nitrogen protection condition, and performing emulsion graft copolymerization reaction under a non-oxidizing atmosphere to obtain hydroxyethyl methacrylate-lignin graft modified natural rubber latex.

In detail, nitrogen may be used as a protective gas to ensure the safe operation of the reaction. Meanwhile, the activator may specifically be tetraethylenepentamine or ethylenediamine, preferably tetraethylenepentamine. The activator is added in an amount of 0.05-0.5 parts, and after the addition of water, the total solid content of the reaction system is controlled at 15-35 wt %. The reaction may be made sufficiently under the action of the activator so as to ensure the quality of the finished product. Meanwhile, in other examples of the present disclosure, the use amounts of respective ingredients may also be selected to be adjusted, and no limitation is made in the examples of the present disclosure.

Meanwhile, it should be further noted that the standing step is carried out at a temperature of 15-45° C. for 10-24 h, so that the activator and water are added to perform the graft copolymerization reaction after completion of the standing operation. The step of the graft copolymerization reaction is carried out at a temperature of 10-60° C. for 10-30 h, and by controlling the temperature and duration of the reaction, the reaction may be guaranteed to be sufficiently performed, so as to obtain a rubber damping material having the characteristics of wide temperate range and high damping, as well as the characteristics of high tensile strength, aging resistance, low heat generation, etc. Undoubtedly, in other examples of the present disclosure, the duration and temperature of standing and reaction may also be adjusted according to environmental or other factors, and no limitation is made in the examples of the present disclosure.

S3: making the hydroxyethyl methacrylate-lignin graft modified natural rubber latex undergo rubber processing operation to obtain modified natural rubber.

In detail, the step of rubber processing operation at least includes steps of coagulation, preforming, washing and drying. Certainly, other conventional rubber processing processes may also be included so as to obtain the hydroxyethyl methacrylate-lignin graft modified natural rubber damping material.

As a preferable solution, the preparation method further includes performing mixing and vulcanization operation on the modified natural rubber, wherein a vulcanization compounding agent needs to be added in the vulcanization operation. Specifically, the positive vulcanization duration of mixed rubber is measured at 150° C. using a rotorless rheometer, and the mixed rubber is vulcanized on a flat vulcanizing machine. In the above, formula of the vulcanization compounding agent is shown in Table 1 below.

TABLE 1

Cyclized Natural Rubber Vulcanization System

| Material Name | Use Amount (part) |
| --- | --- |
| modified natural rubber | 100 |
| zinc 2-ethylhexanoate | 1.0 |
| sulfur | 0.6 |
| zinc oxide | 5.0 |
| N-oxydiethylent-2-benzothiazole sulfonamide (NOBS) | 2.5 |
| bis(thioperoxydi formyl) tetrabutyl diamine (TBTD) | 1.0 |
| N-phenyl-α-naphthylamine | 1.0 |

It should be noted that the parts by weight mentioned in the examples of the present disclosure may be known metering units such as gram and kilogram.

The above high-performance rubber damping material and the method for preparing the same are described in detail below with reference to specific examples.

Example 1

The present example provides a high-performance rubber damping material, which is prepared by the following method:

S1: weighing 100 parts of concentrated natural rubber latex based in dry rubber, adding 4 parts of polyoxyethylene fatty alcohol ether (formulated into 15% aqueous solution before addition), and stirring them uniformly, then adding, based on dry rubber, 10 parts of hydroxyethyl methacrylate and 5 parts of lignin (formulated in advance into an aqueous dispersion with concentration of 50%) with slow stirring, and adding 0.1 parts of an initiator and 0.08 parts of a crosslinking agent dropwise;

S2: standing at 25° C. for 20 hours under the condition of introducing nitrogen for protection, after the standing, adding 0.08 parts of an activator, and adding 280 parts of distilled water, so that a total solid content was about 20%, controlling the temperature at 25° C. under a nitrogen atmosphere, and performing the reaction for 18 hours to obtain hydroxyethyl methacrylate-lignin graft modified natural rubber latex;

S3: making the modified natural rubber latex undergo conventional rubber processing processes such as coagulation, preforming, washing, and drying to obtain the hydroxyethyl methacrylate-lignin graft modified natural rubber; and S4: mixing and vulcanizing the modified natural rubber damping material, wherein reference is made to Table 1 for vulcanization formula. The positive vulcanization duration of mixed rubber at 150° C. was measured using a rotorless rheometer, and the mixed rubber was vulcanized on a flat vulcanizing machine.

Example 2

The present example provides a high-performance rubber damping material, which is prepared by the following method:

S1: weighing 100 parts of concentrated natural rubber latex based in dry rubber, adding 4 parts of polyoxyethylene fatty alcohol ether (formulated into 15% aqueous solution before addition), and stirring them uniformly, then adding, based on dry rubber, 5 parts of hydroxyethyl methacrylate and 10 parts of lignin (formulated in advance into an aqueous dispersion with concentration of 50%) with slow stirring, and adding 0.1 parts of an initiator and 0.08 parts of a crosslinking agent dropwise;

S2: standing at 25° C. for 20 hours under the condition of introducing nitrogen for protection, after the standing, adding 0.08 parts of an activator, and adding 280 parts of distilled water, so that a total solid content was about 20%, controlling the temperature at 25° C. under a nitrogen atmosphere, and performing the reaction for 16 hours to obtain hydroxyethyl methacrylate-lignin graft modified natural rubber latex;

S3: making the modified natural rubber latex undergo conventional rubber processing processes such as coagulation, preforming, washing, and drying to obtain the hydroxyethyl methacrylate-lignin graft modified natural rubber; and S4: mixing and vulcanizing the modified natural rubber damping material, wherein reference is made to Table 1 for vulcanization formula. The positive vulcanization duration of mixed rubber at 150° C. was measured using a rotorless rheometer, and the mixed rubber was vulcanized on a flat vulcanizing machine.

Example 3

The present example provides a high-performance rubber damping material, which is prepared by the following method:

S1: weighing 100 parts of concentrated natural rubber latex based in dry rubber, adding 4 parts of polyoxyethylene fatty alcohol ether (formulated into 15% aqueous solution before addition), and stirring them uniformly, then adding, based on dry rubber, 10 parts of hydroxyethyl methacrylate and 10 parts of lignin (formulated in advance into an aqueous dispersion with concentration of 50%) with slow stirring, and adding 0.12 parts of an initiator and 0.10 parts of a crosslinking agent dropwise;

S2: standing at 25° C. for 24 hours under the condition of introducing nitrogen for protection, after the standing, adding 0.08 parts of an activator, and adding 280 parts of distilled water, so that a total solid content was about 20%, controlling the temperature at 25° C. under a nitrogen atmosphere, and performing the reaction for 20 hours to obtain hydroxyethyl methacrylate-lignin graft modified natural rubber latex;

S3: making the modified natural rubber latex undergo conventional rubber processing processes such as coagulation, preforming, washing, and drying to obtain the hydroxyethyl methacrylate-lignin graft modified natural rubber; and S4: mixing and vulcanizing the modified natural rubber damping material, wherein reference is made to Table 1 for vulcanization formula. The positive vulcanization duration of mixed rubber at 150° C. was measured using a rotorless rheometer, and the mixed rubber was vulcanized on a flat vulcanizing machine.

Example 4

The present example provides a high-performance rubber damping material, which is prepared by the following method:

S1: weighing 100 parts of concentrated natural rubber latex based in dry rubber, adding 4 parts of polyoxyethylene fatty alcohol ether (formulated into 15% aqueous solution before addition), and stirring them uniformly, then adding, based on dry rubber, 15 parts of hydroxyethyl methacrylate and 15 parts of lignin (formulated in advance into an aqueous dispersion with concentration of 50%) with slow stirring, and adding 0.12 parts of an initiator and 0.10 parts of a crosslinking agent dropwise;

S2: standing at 25° C. for 24 hours under the condition of introducing nitrogen for protection, after the standing, adding 0.08 parts of an activator, and adding 280 parts of distilled water, so that a total solid content was about 20%, controlling the temperature at 25° C. under a nitrogen atmosphere, and performing the reaction for 24 hours to obtain hydroxyethyl methacrylate-lignin graft modified natural rubber latex;

S3: making the modified natural rubber latex undergo conventional rubber processing processes such as coagulation, preforming, washing, and drying to obtain the hydroxyethyl methacrylate-lignin graft modified natural rubber; and S4: mixing and vulcanizing the modified natural rubber damping material, wherein reference is made to Table 1 for vulcanization formula. The positive vulcanization duration of mixed rubber at 150° C. was measured using a rotorless rheometer, and the mixed rubber was vulcanized on a flat vulcanizing machine.

Experimental Example 1

The high-performance rubber damping material prepared in Examples 1~4 were tested for performances according to national standards. Test results are shown in Table 2.

TABLE 2

Performance of High-performance Damping Material

|  | Example 1 | Example 2 | Example 3 | Example 4 |
|---|---|---|---|---|
| tensile strength/MPa | 22.23 | 24.55 | 21.31 | 24.69 |
| elongation at break/% | 687 | 567 | 525 | 499 |
| tear strength/kN · m$^{-2}$ | 41 | 39 | 46 | 48 |
| After Aging | | | | |
| tensile strength/MPa | 20.05 | 21.35 | 19.63 | 22.31 |
| elongation at break/% | 639 | 496 | 503 | 412 |
| retention rate of tensile strength/% | 90.19 | 86.97 | 92.12 | 90.36 |
| heat generation by compression/° C. | 14.3 | 13.8 | 16.0 | 16.5 |
| Tg/° C. | −3.7 | −12.3 | −4.3 | 6.2 |
| effective damping temperature range/° C. | 54 | 50 | 55 | 58 |

According to the data in Table 2, it can be seen that for the damping material prepared using the method of the present disclosure, the glass transition temperature may be increased to −15~18° C., the effective damping range may reach −60° C.~40° C., the tensile strength may reach 20~27 MPa, the elongation at break may reach 600~900%, and the tear strength may reach 25~50 (kN·m$^{-1}$).

To sum up, the high-performance rubber damping material provided in the examples of the present disclosure adopts natural rubber latex as a base material, the hydroxyethyl methacrylate and lignin are grafted to the rubber molecular chain of natural rubber latex through graft copolymerization reaction, to form a semi-interpenetrating network structure. By means of a relatively high effective damping temperature range of polyhydroxyethyl methacrylate, and meanwhile the lignin's effect of improving the damping value of materials, the high-performance damping material taking natural rubber as main body has the characteristics of wide effective damping temperature range and high damping, and meanwhile has the characteristics of high tensile strength, aging resistance, low heat generation, etc.

The above-mentioned are merely for preferred examples of the present disclosure, but are not used to limit the present disclosure. For one skilled in the art, various modifications and changes may be made to the present disclosure. Any amendments, equivalent replacements, improvements, and so on, within the spirit and principle of the present disclosure, should be covered within the scope of protection of the present disclosure.

What is claimed is:

1. A method for preparing a high-performance rubber damping material, comprising:
   grafting hydroxyethyl methacrylate and lignin to a rubber molecular chain of natural rubber latex through a graft copolymerization reaction, so as to obtain the high-performance rubber damping material.

2. The method for preparing a high-performance rubber damping material according to claim 1, wherein the grafting hydroxyethyl methacrylate and lignin to a rubber molecular chain of natural rubber latex through a graft copolymerization reaction comprises:
adding a nonionic surfactant to the natural rubber latex, and successively adding the hydroxyethyl methacrylate, the lignin, an initiator and a crosslinking agent after stabilization;
adding an activator and water after standing under a nitrogen protection condition, and performing the graft copolymerization reaction in emulsion under a non-oxidizing atmosphere, to obtain hydroxyethyl methacrylate-lignin graft modified natural rubber latex; and
making the hydroxyethyl methacrylate-lignin graft modified natural rubber latex undergo a rubber processing operation, to obtain modified natural rubber.

3. The method for preparing a high-performance rubber damping material according to claim 2,
wherein in parts by weight, the natural rubber latex is 100 parts based on dry rubber of natural rubber, the hydroxyethyl methacrylate is added in an amount of 1-30 parts, the lignin is added in an amount of 1-20 parts, the nonionic surfactant is added in an amount of 1-5 parts, the initiator is added in an amount of 0.05-0.5 parts, the crosslinking agent is added in an amount of 0.02-0.2 parts, the activator is added in an amount of 0.05-0.5 parts, and after adding the water, a total solid content of a reaction system is controlled at 15-35 wt %.

4. The method for preparing a high-performance rubber damping material according to claim 2,
wherein the standing is carried out at a temperature of 15-45° C. for 10-24 h.

5. The method for preparing a high-performance rubber damping material according to claim 2,
wherein the graft copolymerization reaction is carried out at a temperature of 10-60° C. for 10-30 h.

6. The method for preparing a high-performance rubber damping material according to claim 2,
wherein the rubber processing operation at least comprises coagulation, preforming, washing and drying.

7. The method for preparing a high-performance rubber damping material according to claim 2,
wherein the natural rubber latex is centrifugal concentrated rubber latex of *Hevea brasiliensis*, and a total solid mass fraction is 50-70%;
the nonionic surfactant is polyoxyethylene fatty alcohol ether, and needs to be formulated into an aqueous solution with a concentration of 5 wt-20 wt % before added;
the initiator is isopropyl benzene hydroperoxide or tert-butyl hydroperoxide;
the crosslinking agent is triethylene glycol dimethacrylate; and
the activator is tetraethylenepentamine or ethylenediamine.

8. The method for preparing a high-performance rubber damping material according to claim 2,
wherein the initiator is isopropyl benzene hydroperoxide; and the activator is tetraethylenepentamine.

9. The method for preparing a high-performance rubber damping material according to claim 2,
further comprising performing mixing and vulcanization operation on the modified natural rubber, wherein a vulcanization compounding agent needs to be added in the vulcanization operation, and the vulcanization compounding agent corresponding to each 100 parts of the modified natural rubber comprises 1.0 part of zinc 2-ethylhexanoate, 0.6 parts of sulfur, 5.0 parts of zinc oxide, 2.5 parts of N-oxydiethylent-2-benzothiazole sulfenamide, 1.0 part of bis(thioperoxydiformyl) tetrabutyl diamine and 1.0 part of N-phenyl-α-naphthylamine, in parts by weight.

10. A high-performance rubber damping material, which is prepared by the method for preparing a high-performance rubber damping material according to claim 1.

11. The method for preparing a high-performance rubber damping material according to claim 3,
wherein the natural rubber latex is centrifugal concentrated rubber latex of *Hevea brasiliensis*, and a total solid mass fraction is 50-70%;
the nonionic surfactant is polyoxyethylene fatty alcohol ether, and needs to be formulated into an aqueous solution with a concentration of 5 wt-20 wt % before added;
the initiator is isopropyl benzene hydroperoxide or tert-butyl hydroperoxide;
the crosslinking agent is triethylene glycol dimethacrylate; and
the activator is tetraethylenepentamine or ethylenediamine.

12. The method for preparing a high-performance rubber damping material according to claim 4,
wherein the natural rubber latex is centrifugal concentrated rubber latex of *Hevea brasiliensis*, and a total solid mass fraction is 50-70%;
the nonionic surfactant is polyoxyethylene fatty alcohol ether, and needs to be formulated into an aqueous solution with a concentration of 5 wt-20 wt % before added;
the initiator is isopropyl benzene hydroperoxide or tert-butyl hydroperoxide;
the crosslinking agent is triethylene glycol dimethacrylate; and
the activator is tetraethylenepentamine or ethylenediamine.

13. The method for preparing a high-performance rubber damping material according to claim 5,
wherein the natural rubber latex is centrifugal concentrated rubber latex of *Hevea brasiliensis*, and a total solid mass fraction is 50-70%;
the nonionic surfactant is polyoxyethylene fatty alcohol ether, and needs to be formulated into an aqueous solution with a concentration of 5 wt-20 wt % before added;
the initiator is isopropyl benzene hydroperoxide or tert-butyl hydroperoxide;
the crosslinking agent is triethylene glycol dimethacrylate; and
the activator is tetraethylenepentamine or ethylenediamine.

14. The method for preparing a high-performance rubber damping material according to claim 6,
wherein the natural rubber latex is centrifugal concentrated rubber latex of *Hevea brasiliensis*, and a total solid mass fraction is 50-70%;
the nonionic surfactant is polyoxyethylene fatty alcohol ether, and needs to be formulated into an aqueous solution with a concentration of 5 wt-20 wt % before added;

the initiator is isopropyl benzene hydroperoxide or tert-butyl hydroperoxide;

the crosslinking agent is triethylene glycol dimethacrylate; and the activator is tetraethylenepentamine or ethylenediamine.

15. The method for preparing a high-performance rubber damping material according to claim 3, wherein the initiator is isopropyl benzene hydroperoxide; and the activator is tetraethylenepentamine.

16. The method for preparing a high-performance rubber damping material according to claim 4, wherein the initiator is isopropyl benzene hydroperoxide; and the activator is tetraethylenepentamine.

17. The method for preparing a high-performance rubber damping material according to claim 5, wherein the initiator is isopropyl benzene hydroperoxide; and the activator is tetraethylenepentamine.

18. The method for preparing a high-performance rubber damping material according to claim 3, further comprising performing mixing and vulcanization operation on the modified natural rubber, wherein a vulcanization compounding agent needs to be added in the vulcanization operation, and the vulcanization compounding agent corresponding to each 100 parts of the modified natural rubber comprises 1.0 part of zinc 2-ethylhexanoate, 0.6 parts of sulfur, 5.0 parts of zinc oxide, 2.5 parts of N-oxydiethylent-2-benzothiazole sulfenamide, 1.0 part of bis(thioperoxydiformyl) tetrabutyl diamine and 1.0 part of N-phenyl-α-naphthylamine, in parts by weight.

19. The method for preparing a high-performance rubber damping material according to claim 4, further comprising performing mixing and vulcanization operation on the modified natural rubber, wherein a vulcanization compounding agent needs to be added in the vulcanization operation, and the vulcanization compounding agent corresponding to each 100 parts of the modified natural rubber comprises 1.0 part of zinc 2-ethylhexanoate, 0.6 parts of sulfur, 5.0 parts of zinc oxide, 2.5 parts of N-oxydiethylent-2-benzothiazole sulfenamide, 1.0 part of bis(thioperoxydiformyl) tetrabutyl diamine and 1.0 part of N-phenyl-α-naphthylamine, in parts by weight.

20. The method for preparing a high-performance rubber damping material according to claim 5, further comprising performing mixing and vulcanization operation on the modified natural rubber, wherein a vulcanization compounding agent needs to be added in the vulcanization operation, and the vulcanization compounding agent corresponding to each 100 parts of the modified natural rubber comprises 1.0 part of zinc 2-ethylhexanoate, 0.6 parts of sulfur, 5.0 parts of zinc oxide, 2.5 parts of N-oxydiethylent-2-benzothiazole sulfenamide, 1.0 part of bis(thioperoxydiformyl) tetrabutyl diamine and 1.0 part of N-phenyl-α-naphthylamine, in parts by weight.

* * * * *